INTELLIGENCE STORAGE DEVICES

Filed March 8, 1955

*Inventors*
D. S. RIDLER
R. GRIMMOND
*By* Robert Harding Jr.
*Attorney*

Sept. 13, 1960 D. S. RIDLER ET AL 2,952,840

INTELLIGENCE STORAGE DEVICES

Filed March 8, 1955

2 Sheets-Sheet 2

*Inventors*
D. S. RIDLER
R. GRIMMOND
*By* Robert Harding Jr.
*Attorney*

2,952,840

INTELLIGENCE STORAGE DEVICES

Desmond Sydney Ridler and Robert Grimmond, London, England, assignors to International Standard Electric Corporation, New York, N.Y.

Filed Mar. 8, 1955, Ser. No. 492,982

Claims priority, application Great Britain Mar. 16, 1954

2 Claims. (Cl. 340—174)

This invention relates to the magnetic storage of intelligence.

One form of such stores consists in a toroidal core of magnetic material having a substantially square hysteresis loop, such as ferrite, carrying a coil of wire which may in its simplest form be constituted by a single wire passing through the toroid. It has been proposed to build a large capacity store of such elemental toroid stores by arranging a number of them in co-ordinate array and threading wires in similar co-ordinate array through the cores, one vertical wire and one horizontal wire passing through each toroid. To saturate one such core positively or negatively, pulses are applied to the vertical and horizontal wires passing through the core, the strength of the pulses being such that a pulse in one wire only is ineffective to saturate a core, whereas simultaneous aiding pulses in both wires will saturate the core. Since a particular pair of wires, one horizontal and one vertical, both pass through a single toroid only, pulses applied to such a pair are effective as regards that single toroid only.

By applying successive pulses of binary intelligence to successive pairs of co-ordinate wires by synchronised scanning of the vertical and horizontal wires, intelligence can be sequentially stored in successive rows of the array.

Intelligence stored in such a core can be read by applying saturating current to its coil in a given direction, in response to which a change-over or no change takes place in the magnetic condition of the adjacent core: a change in condition is recognised, or read, by a third wire or by the co-ordinate wires themselves in known manner. Reading wires, one per hole, would normally be provided.

The construction of these stores presents a considerable engineering problem, not only because many thousands of toroids may be involved in complex co-ordinate systems, but because the individual toroids measure only a few millimeters in diameter and require specialised tooling techniques if the dimensional and magnetic requirements imposed by the circuit conditions are to be met. The object of the present invention is to make the tooling problem easier for the manufacturer, to reduce the size of the store and to allow cheaper wiring methods to be used.

The invention comprises a magnetic intelligence store capable of storing a plurality of units of intelligence consisting of a single piece of magnetic material having a substantially square hysteresis loop traversed by magnetising wires at positions so placed that discrete areas surrounding each traverse can be magnetically set in either direction by the passage of electric current through the corresponding wire traverse.

The invention will be clearly understood from the following description of certain embodiments thereof with reference to the accompanying drawings in which:

Fig. 2 shows the hysteresis loops of the toroids of Fig. 1 while

Figure 1:
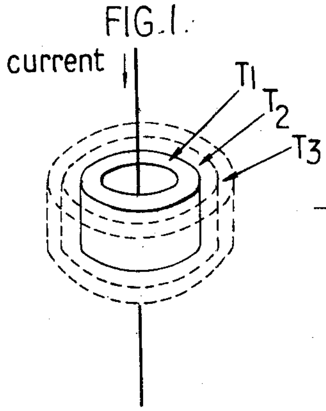
Fig. 1 shows a series of concentric toroids T1, T2, T3.
Figure 2:
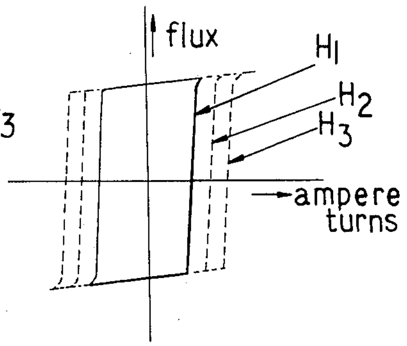

The characteristics of the ferrite storage core T1 in Fig. 1 are represented by the hysteresis loop H1 in Fig. 2. The second toroid T2 around T1 has an internal diameter equal to the external diameter of T1. The hysteresis loop of this second toroid T2 will lie outside the loop of T1 and may be represented by H2. Similarly a third and even larger toroid T3 would have a third and larger hysteresis loop H3, and so on. Ten such toroids will enable intelligence to be recorded in the decimal system. In many instances, however, only the toroid T1 will be used and in this event the intelligence will be recorded in binary code.

Now, if the inner toroid T1 is considered for storage, a "full strength" current pulse of either polarity would be applied to "set" it—i.e. to magnetise the toroid either positively or negatively, or to test its condition. If it is arranged that these pulses do not apply sufficient coercive force to the other toroids T2, T3 . . . etc., then they will not be effected and their presence will not affect the storage function of T1. Hence, it will be understood that T1 may be simply constructed by drilling a hole in a sheet of ferrite or similar material. Further, only the material adjacent to the hole will be brought into use and other independent storage elements may be constructed by drilling other holes in the same sheet provided the spacing is adequate.

Figure 3:
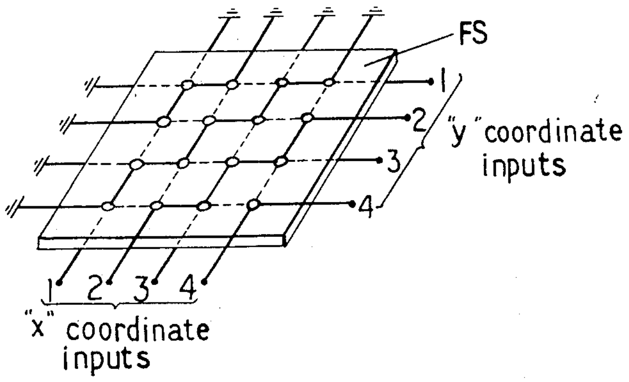
Fig. 3 shows one embodiment of a multiple store according to the invention.

A simple 4 x 4 co-ordinate store using this technique is illustrated in Fig. 3. Obviously, the principle could be extended to larger arrays.

In Fig. 3, each of the wires *x*1 . . . *x*4 is threaded alternately up and down through each hole of the corresponding column of four holes in the ferrite sheet FS. Similarly, each of the wires *y*1 . . . *y*4 is threaded alternately up and down through each hole of the corresponding row of four holes in FS. The pair of wires *x*1, *y*1 pass together through a single hole in FS, namely, the top left-hand hole. Similarly, each other combination of two wires, one from the *x* wires and one from the *y* wires, passes through a corresponding hole, there being sixteen such pairs of wires, one pair characteristic of each of the sixteen holes.

Figures 4, 5, 6:
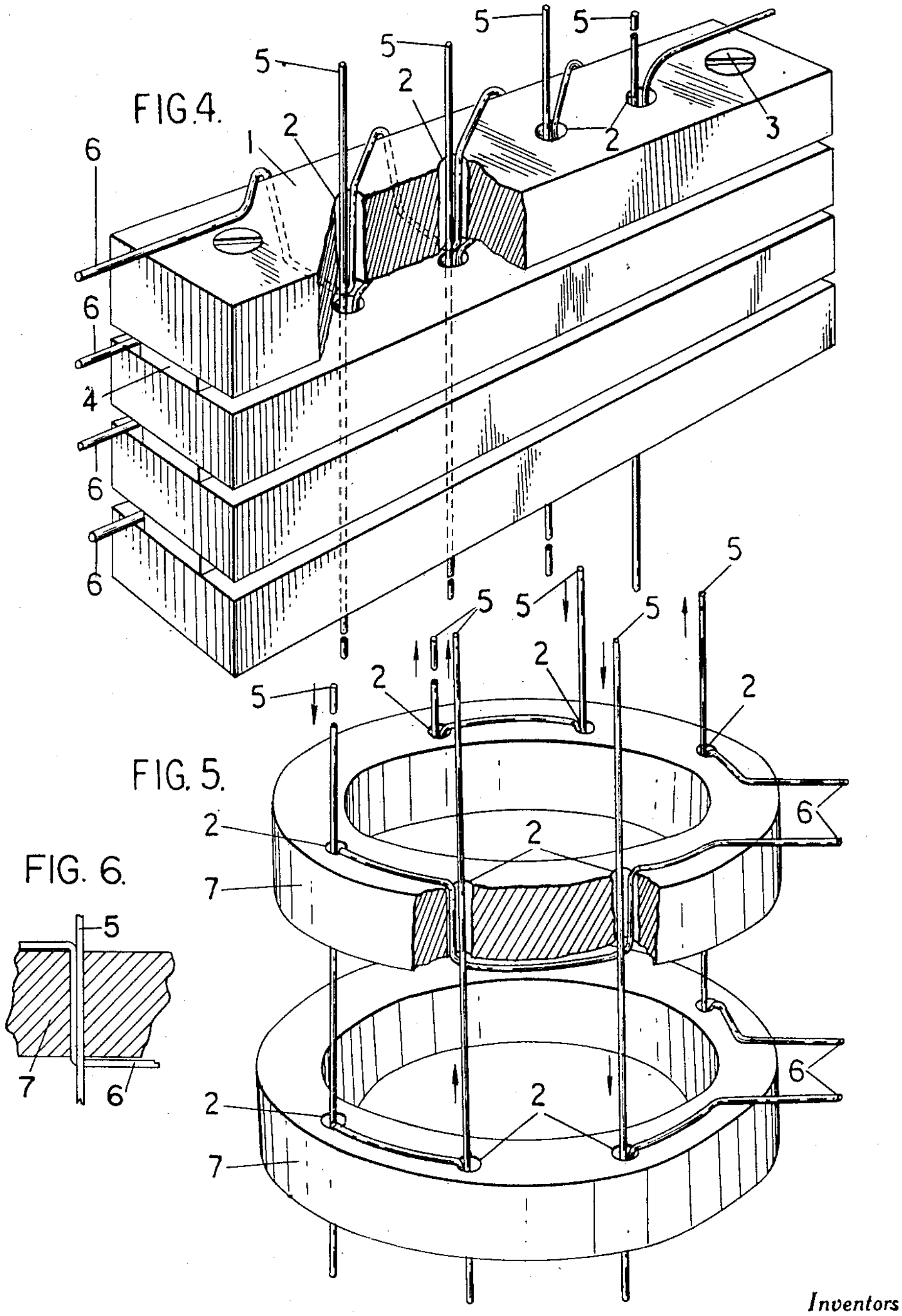
Fig. 4 shows an alternative embodiment of the invention in which the multiple store is built up from a number of component bars.
Fig. 5 shows a further alternative embodiment in which the multiple store is built up from a number of component rings.
Fig. 6 shows a section of one of the rings of Fig. 4 with an alternative arrangement in which the wires passing through the store are in a moulded contact therewith.

In fact, it is unnecessary to have holes in the ferrite plate: fundamental requirement is that the pairs of wires pass through the plate at suitable spaced points. Thus if ferrite material is moulded around an array of wires arranged exactly as shown in Fig. 3, it will be unnecessary to drill holes in the ferrite. The arrangement of this nature is shown in Fig. 6. The pairs of wires will pass through the plate at the appropriate spaced points, and pulses transmitted simultaneously through any pair of wires will set or saturate a toroid of ferrite surrounding the lateral passage of that pair of wires through the moulded plate. In such a moulded store the ferrite could totally enclose the wires except of course for the terminations, or alternatively, enclose the lateral sections of the wires only, the longitudinal sections of the wires being left free on both sides of the molded plate.

It will be seen that the store shown in Fig. 3 is constituted by a plate of magnetic material such as ferrite traversed by magnetising wires *x*1 . . . *x*4, *y*1 . . . *y*4, at positions so spaced that discrete areas such as T1, surrounding each traverse can be magnetically set in either direction independently of one another by the passage of electric current through the corresponding wire traverse. In Fig. 3, paired sections of the coordinately-arranged groups of wires $x1 \ldots x4$, $y1 \ldots y4$, for example the sections of wires $x1$, $y1$, passing through the top left-hand hole constitute the traverses, which occur at each intersection of the wires $x1 \ldots x4$ with the wires $y1 \ldots y4$.

If co-ordinate selection is not required, the operating wire traverses at the various spaced points can be single wires, or any desired combination of wires, so as to be operated in any desired manner.

Some or all of the wires may be in the form of conductive lines deposited in any known manner on the ferrite plate. Thus, lines in silver ink may be painted or printed on to the sheet and through the holes, and then consolidated by heat, which in the case of ferrites can be up to 500° C.

Fig. 4 shows a 4 x 4 store made up of four ferrite bars 1 each drilled with four holes 2. The bars are held together in one unit by screws 3 and are separated from each other by distance pieces 4. The column wires 5 pass vertically through holes in successive bars. The row wires 6 pass along each bar, being threaded through each hole in turn, entering each hole at the top. As will be seen from the cut-away portion of the top bar, the row and column wires lie parallel to each other within the holes 2.

Fig. 5 shows a 2 x 6 store in which the bars have been replaced by rings 7 carried on a vertical cyclindrical mounting not shown. The column wires 5 pass vertically through holes 2 in successive rings. The row wires 6 pass round each ring being threaded through each hole in turn. As will be seen from the cut-away portion of the top ring, the row and column wires lie parallel to each other within the holes 2. Fig. 6 shows the wires moulded in the core, as an alternative arrangement, as referred to in connection with Fig. 3.

The wires could be arranged in the manner adapted in Fig. 4, but if this is done and all the storage elements in one ring contain the same intelligence, there is a risk of an unwanted magnetic field being established around the ring as a whole. This can be prevented if current is applied to alternate column wires in alternate directions as indicated by the arrows in Fig. 5 and if the row wires are threaded alternately up and down through successive holes in the ring. The wiring arrangement described in Fig. 5 could if desired be adopted in a store of the type described in Fig. 4.

Another alternative arrangement would be to divide the holes in one bar or ring into groups; one row wire passing through each hole in one and only one group. Thus a bar or ring with thirty holes could be arranged to have, say, six groups of five holes each. In this way six diffierent "words" could be stored in one bar or ring. The wiring could be arranged as described in either Fig. 4 or Fig. 5.

When considering the embodiment of the invention it will be appreciated that it is possible to drill a hole to a diameter much smaller than that of the conventional toroid. In this way it is possible to reduce the mean magnetic path length of the storage element and so to reduce the number of ampere-turns required for the input, using any given material. Also a hole in a plate can easily be given a greater depth than the depth of the conventional toroid, the determining factor being the thickness of the plate. The flux, or volt-time integral per turn, can be increased without increasing the losses, if the hole is made deep in relation to its diameter, and this increase reduces the amount of amplification necessary. In the invention the volume of magnetised material per storage element is reduced, a fact which reduces heat-generation during operation. The heat that is generated is dissipated not only by air-cooling but also by conduction through the ferrite itself and faster speeds of operation are therefore possible.

While the principles of the invention have been described above in connection with specific embodiments, and particular modifications thereof, it is to be clearly understood that this description is made only by way of example and not as a limitation on the scope of the invention.

What we claim is:

1. A magnetic intelligence store capable of storing a plurality of units of intelligence, comprising a ring of molded magnetic material having a substantially rectangular hysteresis loop, and electric conductors passing at spaced positions around said ring through the magnetic material from one surface to another, in a direction parallel to the axis of said ring, said piece of magnetic material being in molded contact with at least those portions of the said conductors which pass through it from one surface to another surface.

2. A magnetic intelligence store comprising a stack of rings of moulded magnetic material, as claimed in claim 1, and in which said conductors are in moulded contact with said respective rings at aligned and spaced positions around said rings.

References Cited in the file of this patent

UNITED STATES PATENTS

| | | |
|---|---|---|
| 2,474,988 | Sargrove | July 5, 1949 |
| 2,724,103 | Ashenhurst | Nov. 15, 1955 |
| 2,732,542 | Minnick | Jan. 24, 1956 |
| 2,736,880 | Forrester | Feb. 28, 1956 |
| 2,776,411 | Anderson | Jan. 1, 1957 |
| 2,784,391 | Rajchman et al. | Mar. 5, 1957 |
| 2,792,563 | Rajchman | May 14, 1957 |

FOREIGN PATENTS

| | | |
|---|---|---|
| 115,025 | Australia | Apr. 17, 1942 |

OTHER REFERENCES

Electrical Manufacturing for December 1949, an article entitled "Magnetic Ferrites," by C. L. Snyder, E. Albers-Schoenberg and H. A. Goldsmith, pp. 86 to 91.